United States Patent [19]
Schwartz

[11] 3,982,839
[45] Sept. 28, 1976

[54] APPARATUS FOR POSITIONING AN ARTICLE ON A WALL

[76] Inventor: Morton Schwartz, 54 Shirley Lane, White Plains, N.Y. 10607

[22] Filed: Mar. 21, 1975

[21] Appl. No.: 560,725

[52] U.S. Cl. .............................. 356/250; 356/138; 356/172
[51] Int. Cl.² ...................... G01C 9/12; G01C 9/16
[58] Field of Search ............ 356/138, 172, 248, 250

[56] References Cited
UNITED STATES PATENTS

| 3,393,321 | 7/1968 | Früngel | 250/573 |
| 3,820,903 | 6/1974 | Kindl | 356/138 |
| 3,854,820 | 12/1974 | Hansen | 356/172 |
| 3,858,984 | 1/1975 | Denton et al. | 356/250 |

Primary Examiner—Vincent P. McGraw
Attorney, Agent, or Firm—Alfred L. Michaelsen

[57] ABSTRACT

An apparatus which provides a reference light beam projected onto one and preferably all the walls of a room whereby a reference line is provided for positioning articles thereon.

4 Claims, 3 Drawing Figures

U.S. Patent  Sept. 28, 1976  3,982,839
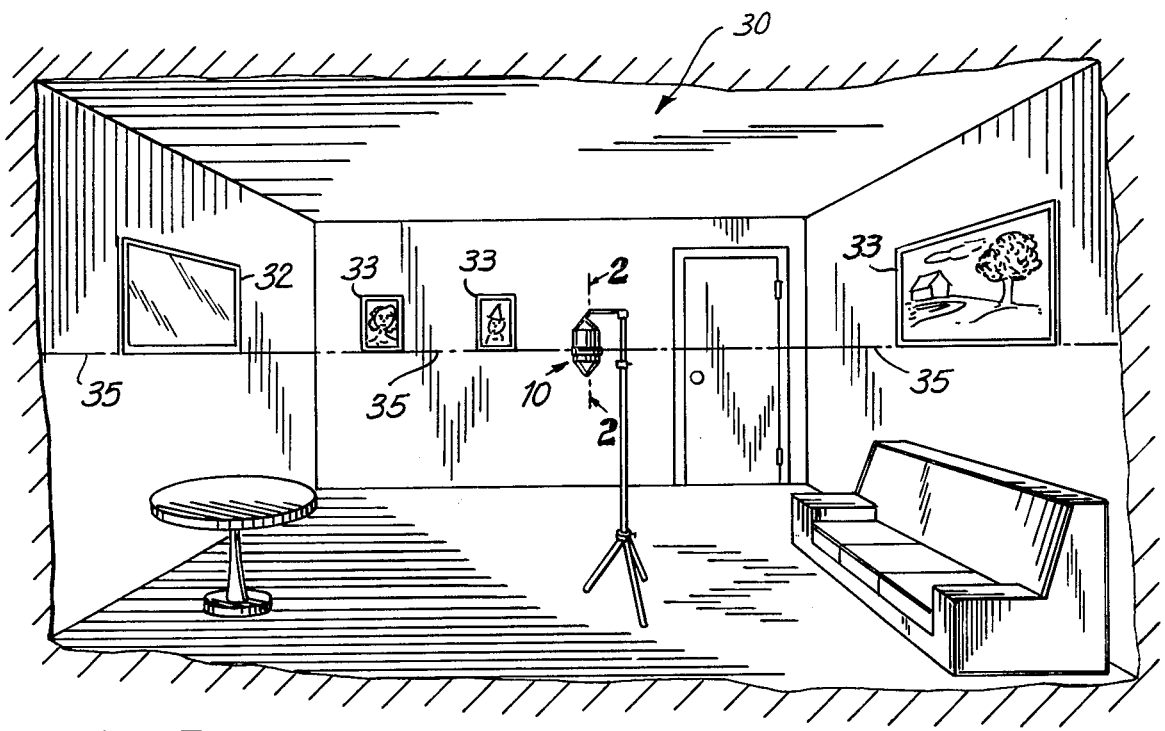
FIG.3
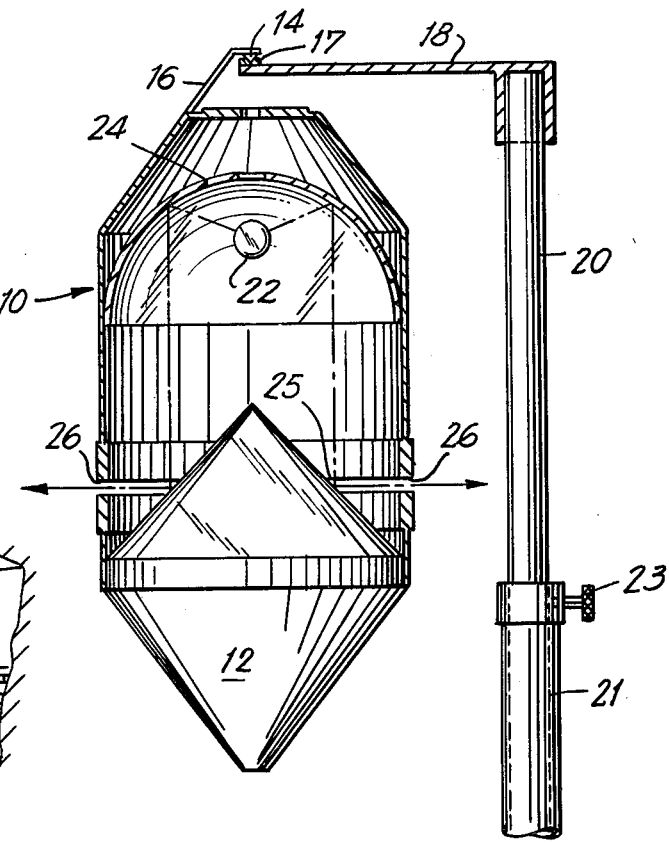
FIG.2
FIG.1
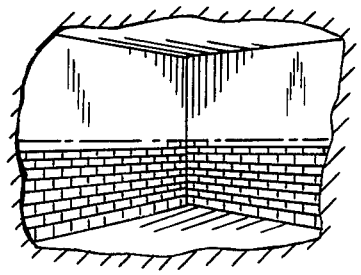

APPARATUS FOR POSITIONING AN ARTICLE ON A WALL

BACKGROUND OF THE INVENTION

Within the scope of common experience it is known that it can be difficult to position accurately articles on a wall. For example, when paneling or wall paper is put on a wall the first sheet must be positioned such that the side edges are vertical. If the edges are not vertical, obviously all subsequent sheets will either be misaligned or will be diagonally mounted. An even more difficult problem is presented when it is desired to affix a mirror to a wall since an article such as a mirror cannot be conveniently moved after it has been affixed to the wall.

The problem associated with correctly positioning an article on a wall are well recognized. In an effort to provide a solution to these problems, it has been conventional practice to provide a reference line on a wall, for example a chalk line or a line drawn on a wall using a pencil. If defacing the wall is acceptable, such an approach provides a tolerable solution to the problem. However, a related but more difficult problem arises when it is desired to mount articles on opposing or adjacent walls and the articles must be accurately positioned with respect to each other. As an example, if two or more paintings or mirrors are to be mounted on opposed or adjacent walls it is obviously desirable that the upper surfaces of the mirrors or articles be horizontal and, additionally, that the horizontal surfaces of each such article lie in a common horizontal plane. Recognizing that floors and ceilings are seldom horizontal or parallel, a substantial and difficult problem is presented to those engaged in such work.

A particularly difficult problem is presented when, as shown in FIG. 1, two or more walls of a room are to be covered with a plurality of square or rectangular objects, for example ceramic tiles or mirrors which are squre or rectangular in shape. Considering tiles as an example, conventional practice requires that a horizontal line be marked on all the walls upon which tiles are to be mounted. Such a procedure is imperative to insure that the first tier of tiles are all horizontally mounted and the top or bottom edges of the tiles are in a common horizontal plane. Obviously, if the first tier of tiles are not correctly mounted, all subsequently mounted tiles will be skewed. In the event that tiles are to be mounted on all the walls of a room, conventional procedure is to start mounting tiles at one corner of the room and work outwardly therefrom. Clearly, when the last tiles of the first tier are mounted, it is mandatory that their horizontal surfaces be aligned. While it is possible to achieve such alignment through the use of a line marked upon a wall, it will be appreciated that it is a time consuming task to provide such a reference line, especially in view of the fact that such a reference line may have to be extended across a surface upon which tiles will not be mounted, e.g., a door.

The invention disclosed herein provides a novel, inexpensive and effective solution to the problem of positioning one or more articles on either a single wall or on adjacent or opposed walls.

SUMMARY OF THE INVENTION

My invention resides in providing an enclosure which is appropriately mounted so as to automatically assume a vertical orientation. Included within the enclosure is a light source and reflecting means for projecting a narrow reference light beam onto one or more walls. The light source provides a horizontal light beam extending outwardly preferably in a horizontal plane, so that a reference light beam is provided on all the walls of the room in which the light source is located. In this manner, a reference light beam is provided on adjacent and opposed walls whereby articles may be mounted on such walls so that horizontal surfaces of the articles lie in a common horizontal plane.

DESCRIPTION OF THE DRAWINGS

FIG. 1 is a perspective view of a portion of a room having tiles on a portion of the walls.

FIG. 2 is a side view, in section, of a preferred apparatus embodiment of my invention.

FIG. 3 is a perspective view of a room and illustrates the method of my invention.

DESCRIPTION OF PREFERRED EMBODIMENTS

Referring to FIG. 2, there is shown an enclosure generally indicated by the reference No. 10. In the lower portion of the enclosure 10 there is provided weight 12. Affixed to the upper portion of the enclosure 10 are means suitable for insuring the automatic vertical positioning of the enclosure 10, for example as shown in FIG. 2 there is provided a pivot 14 which is connected to the enclosure 10 by a bracket 16. The pivot 14 may be received in a bearing 17 mounted on a horizontally extending arm 18. The arm 18 may advantageously be mounted on a vertical support member 20 by the use of a mounting means which permits vertical movement and positioning of the arm 18. For example, the support 20 may be a shaft which is slidably received in tube 21. A set screw 23 may be used to hold the support shaft 20.

Disposed within the enclosure 10 is a light source 22. The light source 22 may be any form of high intensity light bulb powered from an appropriate AC or DC supply. In the embodiment of my invention shown in FIG. 2, a parabolic mirror 24 substantially surrounds the light source 22. Preferably, the light source 22 is located at the focus of the parabolic curve defined by the mirror 24. In this manner, light emminating from the light source is reflected by the mirror 24 and is downwardly directed in substantially parallel beams.

Disposed beneath the light source 22 is a conical mirror 25. Thus, a portion of the downwardly directed light from the parabolic mirror 24 is reflected horizontally and passes out of the enclosure 10 through a slit or slits 26. Preferably, the slit 26 extends substantially around the enclosure 10 whereby a horizontal plane of light is projected outwardly in substantially a 360°arc. For clarity, support connection which bridge the slit 26 are not shown.

Referring to FIG. 3, there is shown a perspective view of a room 30 having positioned in the center thereof a projecting light beam source of the type shown in FIG. 2. Thus, when used, the device of FIG. 2 would be positioned at approximately the center of a room and the light source contained therein would be turned on whereupon a horizontal beam of light would be projected onto all of the walls of the room. The elevation of the light source may then be adjusted until the horizontal light beam is positioned on a wall at a desired location. When such positioning has been achieved, it will be seen that a reference light beam 35 will be projected onto and will be visible on all of the walls of the room and the light beam projected onto each wall will be horizontal and will be located in a horizontal plane which is common to all of the light beam lines on each of the walls. Thus, articles may be positioned on one or more walls and if a horizontal surface of each of the articles is aligned with the projected light beam on a respective wall, the result will automatically be achieved that each of the articles will be horizontally mounted and a respective horizontal surface of each article will lie in a common horizontal plane. For example, referring to FIG. 3 it will be seen that the lower horizontal surfaces of the pictures 33 and the mirror 32 are all horizontal and are all disposed in a common horizontal plane.

Alternatively, it will be seen that after one article is mounted it is but a simple matter to reposition the light beam source so as to provide a horizontal light beam on another wall which is above or below the previous positioned by and predetermined amount. In this regard, the support 20 shown in FIG. 2 may advantageously be provided with a ruler or other means by the use of which enclosure 10 can be repositioned, upwardly or downwardly, by a fixed amount.

In addition to the utility of my invention hereinbefore pointed out, it will also be appreciated that through the use of a method and apparatus which embodies my invention, a reference line can be provided upon a wall without defacing a wall. Thus, before an article is mounted on the wall, consideration can be given to the appropriate location of the upper or lower surface of the article without marking or otherwise defacing the wall.

In summary, I hereinbefore disclosed a method and a novel and inexpensive apparatus whereby articles may be conveniently but accurately positioned on a wall. While I have disclosed a preferred embodiment of the method and apparatus of my invention, it will be appreciated that other embodiments of my invention may be perceived by those skilled in the art. For example, because of the simplicity of my apparatus certain modifications may readily be made. Thus, referring to FIG. 2, the conical mirror 25 and the parabolic mirror 24 may be interchanged and light source 22 moved downward so that light reflected form the parabolic mirror is directed upwardly and then outwardly. As another modification, either in lieu of the horizontal slit 26 or in addition thereto, the enclosure 10 may conveniently be provided with one or more vertical slits whereby a vertical reference line or lines will be projected onto one or more walls.

Thus, recognizing the inherent simplicity of my invention it will be appreciated that others may perceive different embodiments thereof without departing from the scope of my invention as defined by the claims appended hereto.

I claim:

1. An apparatus for projecting a directionally oriented light beam onto the walls of a room, said light beam providing a reference line for positioning an article on one of said walls, said apparatus comprising:
   a. a vertically adjustable support member;
   b. a weighted enclosure vertically suspended from said support member;
   c. a light source mounted within said enclosure;
   d. means defining a slit in the wall of said enclosure, said slit extending in a horizontal plane and extending substantially entirely around said enclosure; and
   e. means for reflecting light from said light source outwardly through said slit whereby, when said enclosure is suspended from said support member and is positioned within a room and said light source is activated, a horizontal light beam is projected onto the walls of said room and may be utilized when positioning an article on a wall.

2. The apparatus of claim 1 wherein said light reflecting means comprises a first mirror and a second mirror and said light source is positioned between said first and second mirror.

3. The apparatus of claim 2 wherein said second mirror is conical and is disposed adjacent to said slit.

4. The apparatus of claim 3 wherein said first mirror is parabolic and reflects light downwardly to said second, conical mirror.

* * * * *